(12) United States Patent
Takahashi et al.

(10) Patent No.: US 11,018,542 B2
(45) Date of Patent: May 25, 2021

(54) ROTATING MACHINERY WITH THREE-PHASE ARMATURE WINDINGS AND FIRST AND SECOND PARALLEL WINDINGS

(71) Applicant: MITSUBISHI POWER, LTD., Yokohama (JP)

(72) Inventors: Kazuhiko Takahashi, Yokohama (JP); Harumasa Tsuchiya, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 169 days.

(21) Appl. No.: 16/535,957

(22) Filed: Aug. 8, 2019

(65) Prior Publication Data
US 2020/0076264 A1    Mar. 5, 2020

(30) Foreign Application Priority Data
Aug. 28, 2018 (JP) .............................. JP2018-159173

(51) Int. Cl.
*H02K 3/28* (2006.01)
*H02K 3/18* (2006.01)
*H02K 3/12* (2006.01)

(52) U.S. Cl.
CPC ................. *H02K 3/28* (2013.01); *H02K 3/12* (2013.01); *H02K 3/18* (2013.01)

(58) Field of Classification Search
CPC ............. H02K 1/165; H02K 3/14; H02K 3/16
See application file for complete search history.

(56) References Cited

U.S. PATENT DOCUMENTS 2,778,962 A    1/1957   Taylor
7,834,508 B2 * 11/2010 Tokumasu ............... H02K 3/28
                                                          310/198
(Continued)

FOREIGN PATENT DOCUMENTS

CN        101499685 A    8/2009
EP          2051350 A2    4/2009
(Continued)

OTHER PUBLICATIONS

Chinese Office Action dated Jan. 28, 2021 for Chinese Patent Application No. 201910729750.5.
(Continued)

*Primary Examiner* — Quyen P Leung
*Assistant Examiner* — Minki Chang
(74) *Attorney, Agent, or Firm* — Volpe Koenig

(57) ABSTRACT

Rotating machinery includes a two-pole rotor, a stator core with seventy-two slots, and three-phase armature windings, as an example. The armature winding has two phase belts per phase. The phase belt includes a first parallel winding and a second parallel winding which are arranged in the stator slots as top coils and bottom coils. When a circumferential mean position of all top coils and bottom coils included in the phase belt is defined as a phase belt center, an arrangement of the first and second parallel windings in the phase belt, as viewed in order of proximity to the phase belt center, is such that the first and second parallel windings are arranged in order of second/first/second/first/first/second/first/second/first/second/second/first parallel windings as the top coils, and the first and second parallel windings are arranged in order of first/second/second/first/second/first/first/second/first/second/second/first parallel windings as the bottom coils connected to the top coils.

1 Claim, 3 Drawing Sheets

(56) References Cited

U.S. PATENT DOCUMENTS

| | | | |
|---|---|---|---|
| 8,008,829 B2 * | 8/2011 | Tokumasu | H02K 3/28 |
| | | | 310/198 |
| 10,090,722 B2 * | 10/2018 | Yoshida | H02K 3/14 |
| 10,193,406 B2 * | 1/2019 | Tanaka | H02K 3/28 |
| 2009/0195105 A1 | 8/2009 | Tokumasu et al. | |
| 2015/0123508 A1 | 5/2015 | Yoshida et al. | |

FOREIGN PATENT DOCUMENTS

| | | |
|---|---|---|
| EP | 2093862 A2 | 8/2009 |
| EP | 2871755 A1 | 5/2015 |
| JP | 2015-091205 A | 5/2015 |

OTHER PUBLICATIONS

Extended European Search Report dated Jan. 22, 2020 for the European Patent Application No. 19189242.1.

\* cited by examiner

RATIO BETWEEN COIL CURRENT AND LOAD CURRENT

ROTATING MACHINERY WITH THREE-PHASE ARMATURE WINDINGS AND FIRST AND SECOND PARALLEL WINDINGS

CLAIM OF PRIORITY

The present application claims priority from Japanese Patent application serial no. 2018-159173, filed on Aug. 28, 2018, the content of which is hereby incorporated by reference into this application.

TECHNICAL FIELD

The present invention relates to rotating machinery and concerns a rotating machinery that is advantageously suited for large rotating machinery such as e.g. turbine generators.

BACKGROUND ART

Since an output current of a large-capacity generator is large, electro-magnetic force and heat generated by armature windings are large. As countermeasures against this, a method is used that configures armature windings to form plural parallel circuits, thereby reducing current per armature winding and mitigating electro-magnetic force and temperature rise.

However, in a case where the number of parallel circuits is not a divisor of the number of poles, currents flowing through the parallel circuits are biased and a current that circulates across the parallel circuits arises. Due to this circulating current, loss of armature windings increases and coil temperature rises; this poses problems as follows: a decrease in efficiency and a possibility of damaging to coil insulation.

Here, first, an explanation is provided about a principle in which a circulating current across circuits is produced by increasing the number of parallel circuits through comparison between a coil connection method in two-pole two parallel circuits which are mainly used in large rotating machinery and a coil connection method in two-pole four parallel circuits in which the number of parallel circuits has increased to four.

FIG. 1 depicts a cross section of a stator of a generator. For the generator depicted in this drawing, when the number of poles of a rotor 100 is assumed to be two, the number of stator slots 50 is seventy-two and, therefore, the number of stator slots 50 per phase and per pole is twelve.

As depicted in FIG. 1, a stator core 10 made of magnetic steel sheets has axially elongated stator slots 50 formed along its inner circumference at predetermined intervals in a circumferential direction to hold armature windings therein and there are teeth 40 between each of these stator slots 50 in the circumferential direction. Two armature windings are held inside each of the stator slots 50 at top and bottom (inner and outer circumference sides) in a radial direction; a coil held in an inner circumference side is referred to as a top coil 20 and a coil held in an outer circumference side is referred to as a bottom coil 30.

FIG. 2 is a diagram of the circumferentially developed stator depicted in FIG. 1, where U phase armature windings are depicted out of armature windings of three phases U, V, and W. Also, a coordinate axis θ indicates a circumferential direction and a coordinate axis Z indicates an axial direction. The coordinate axes in FIGS. 1 and 2 indicate the same directions.

As depicted in this drawing, top coils 20 and bottom coils 30 are held in the stator core 10, positioned at regular intervals in the circumferential direction. Since the number of stator slots 50 per phase and per pole is twelve, there are twelve top coils 20 and twelve bottom coils 30 for each pole, i.e., twenty-four coils for each of two poles. Here a coil Group of top coils 20 and bottom coils 30 that are positioned for one pole is defined as a phase belt. This phase belt is a coil group which is denoted by a reference numeral 60 in FIG. 2. A reference numeral 70 denotes a terminal.

Here, U1 and U2 are taken to denote two parallel circuits. In the case of two-pole two parallel circuits, by configuring one phase belt 60 as U1 and the other phase belt 60 as U2, currents flowing through the parallel circuits are balanced and no circulating current across the parallel circuits arises. However, in a case where the number of parallel circuits is increased to four for the sake of current reduction, it is needed to allocate two parallel circuits U1 and U2 to one phase belt 60. In that case, currents flowing through U1 and U2 are not balanced and a circulating current across the parallel circuits arises.

One method for restraining the circulating current is to change combinations of coil connections. For example, Japanese Unexamined Patent Application Publication No. 2015-91205 (Patent document 1) describes a connection method for reducing the number of jumper connections, so that the circulating current across circuits will be restrained even in an arrangement of two-pole four parallel circuits in which armature windings are configured; this is depicted in FIG. 3. FIG. 3 only depicts one phase belt and the other phase belt is the same.

According to Japanese Unexamined Patent Application Publication No. 2015-91205 (Patent document 1) depicted in FIG. 3, in the arrangement of two-pole four parallel circuits in which armature windings are configured, the number of jumper connections 80 is reduced, so that the circulating current across circuits will be restrained even in such arrangement. In this arrangement, top coils 20 and bottom coils 30 are held inside stator slots (see FIG. 1), placed in inner and outer positions respectively inside the slots. The top coils 20 and bottom coils 30 are connected to form armature windings. The armature windings are grouped in 2n phase belts 60 per phase and each of the phase belts 60 is comprised of pairs of parallel windings. When a circumferential mean position of all top coils 20 and bottom coils 30 included in each of the phase belts 60 is defined as a phase belt center and an arrangement of first and second parallel windings in at least one phase belt 60 is viewed in an order of proximity to the phase belt center, the first and second parallel windings are arranged in an order of the first, second, second, first, first, second, first, second, second, first, second, and first parallel windings in the top coils 20 or the bottom coils 30, and the first and second parallel windings are arranged in an order of the first, second, second, first, second, first, first, second, first, second, second, and first parallel windings in the other bottom coils 30 connected to the abovementioned top coils 20 or the other top coils 20 connected to the abovementioned bottom coils 30.

SUMMARY OF THE INVENTION

However, according to study of the inventors, in the technical approach described in Japanese Unexamined Patent Application Publication No. 2015-91205 mentioned above, the number of jumper connections 80 is reduced, but the circulating current in load operation may not decrease so much, and it is deemed likely that this approach does not lead to reduction of loss.

An object of the present invention which has been developed in view of the point noted above is to provide a rotating machinery in which the circulating current in load operation can be decreased and loss of armature windings can be reduced.

In order to achieve the foregoing object, a rotating machinery of the present invention includes a 2n-pole rotor, a stator core with 72n stator slots, and three-phase armature windings, where n denotes an integer not less than 1. Each of the stator slots houses a top coil on an inner radius side of each of the stator slots and a bottom coil on an outer radius side thereof. Each of the armature windings is formed by connecting the top coil and the bottom coil and has 2n phase belts per phase. Each of the phase belts includes a first parallel winding and a second parallel winding. The first and second parallel windings are arranged in the stator slots as the top coil and the bottom coil. Assuming that a circumferential mean position of all top coils and bottom coils included in each of the phase belts is defined as a phase belt center, an arrangement of the first and second parallel windings in at least one phase belt, as viewed in an order of proximity to the phase belt center, is such that the first and second parallel windings are arranged in an order of the second, first, second, first, first, second, first, second, first, second, second, and first parallel windings as the top coils or the bottom coils, and the first and second parallel windings are arranged in an order of the first, second, second, first, second, first, first, second, first, second, second, and first parallel windings as the other bottom coils connected to the abovementioned top coils or the other top coils connected to the abovementioned bottom coils.

According to the present invention, the circulating current in load operation can be decreased and loss of armature windings can be reduced.

DETAILED DESCRIPTION OF EMBODIMENTS

Figure 1:
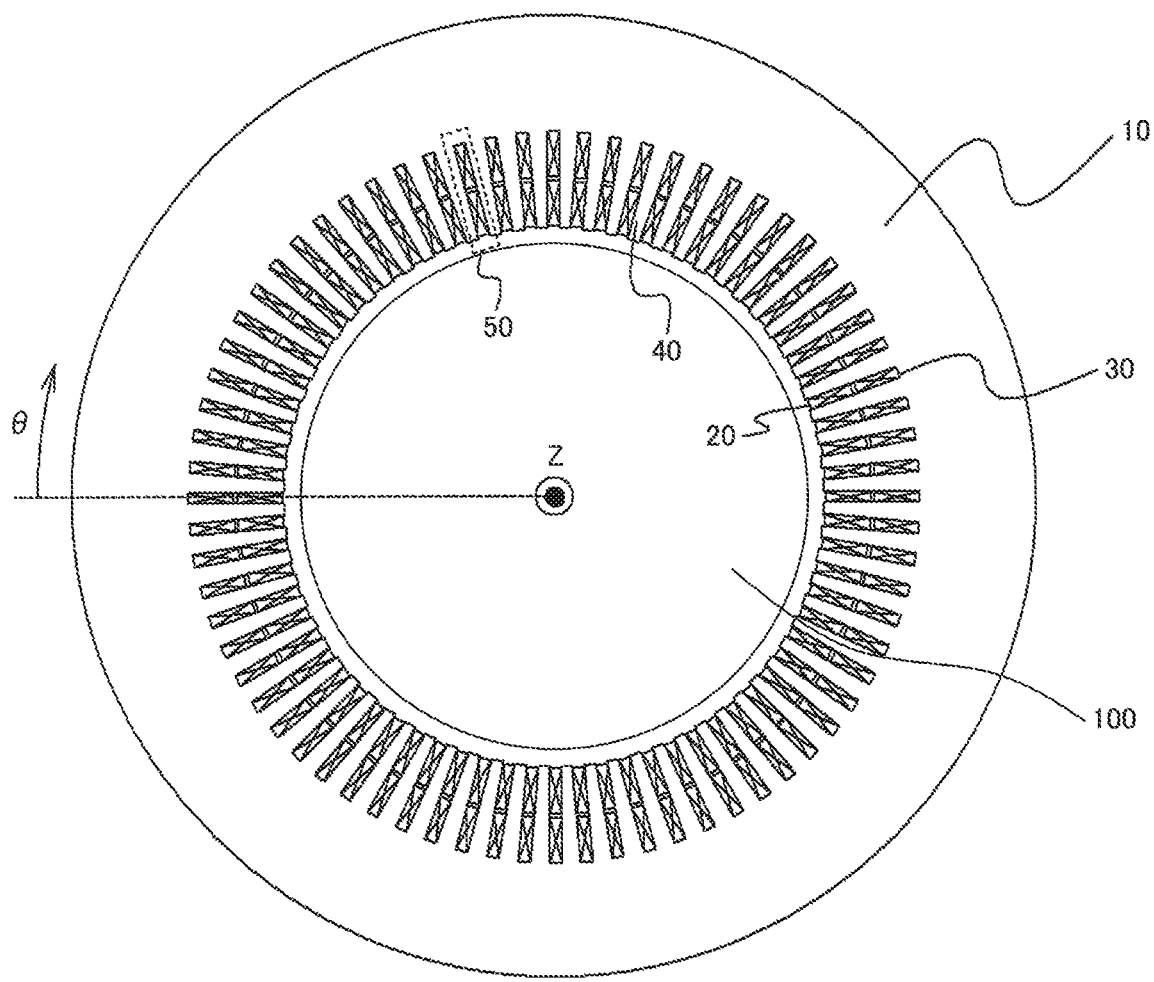
FIG. 1 is a cross section of a stator of a rotating machinery.
Figure 2:
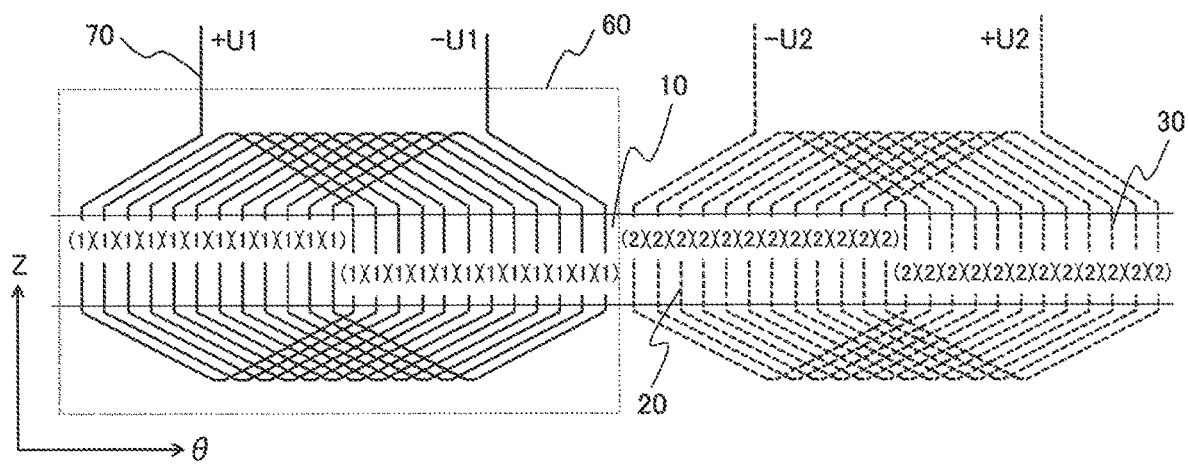
FIG. 2 is a connection diagram in which the stator of the rotating machinery illustrated in FIG. 1 has been developed circumferentially, depicting only U phase armature windings and terminals in an arrangement of two-pole two parallel circuits.
Figure 3:
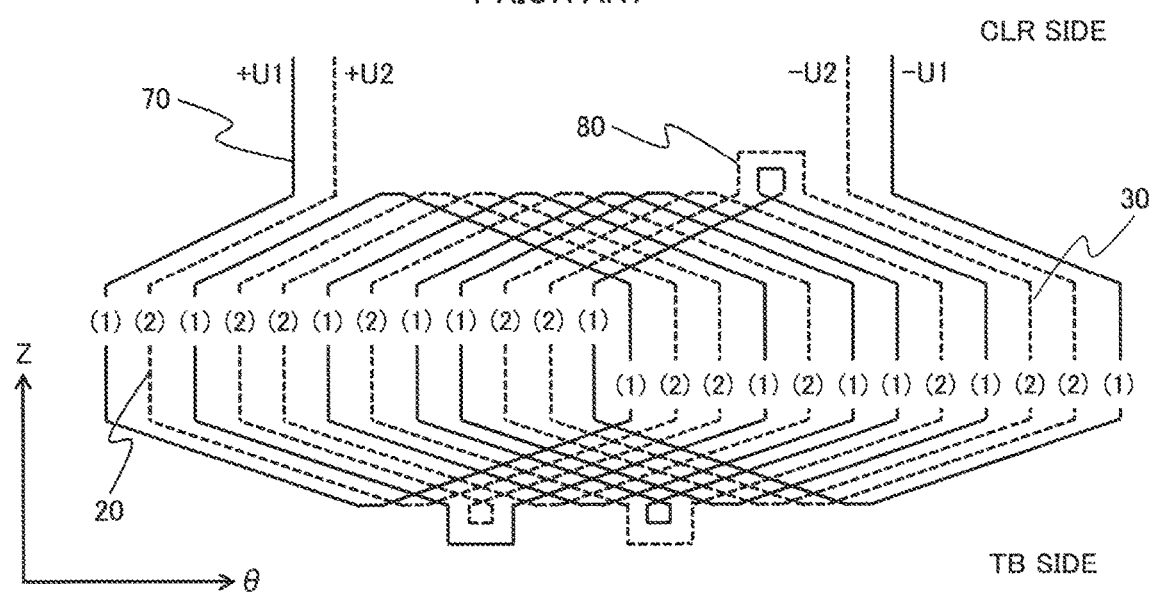
FIG. 3 is a diagram depicting a method of connections in a phase belt with regard to a rotating machinery of prior art (Patent document 1)

In the following, a rotating machinery of the present invention is described based on an embodiment illustrated. Now, identical reference numerals are used to denote components corresponding to those in FIGS. 2 and 3.

Figure 4:
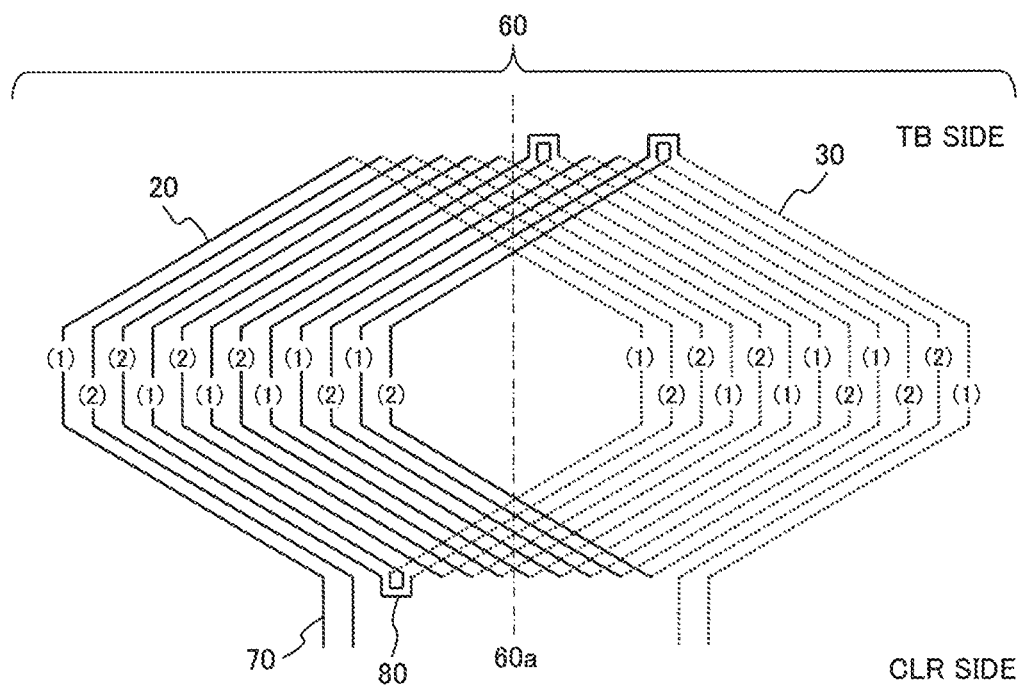
FIG. 4 is a diagram depicting a method of connections in one phase belt with regard to a first embodiment of a rotating machinery of the present invention.

FIG. 4 depicts a method of connections in one phase belt with regard to a first embodiment of a rotating machinery of the present invention.

As depicted in this drawing, the rotating machinery of the present embodiment includes a rotor with 2n poles, when n is assumed to be an integer of 1 or more, a stator with 72n stator slots 50, and armature windings of three phases, with top coils 20 and bottom coils 30 being held inside the stator slots 50, placed in inner and outer positions respectively inside the slots. The top coils 20 and the bottom coils 30 are connected to form the armature windings. The armature windings are grouped in 2n phase belts 60 per phase and each of the phase belts 60 includes pairs of parallel windings. Assuming that a circumferential mean position of all top coils 20 and bottom coils 30 included in each of the phase belts 60 is defined as a Phase belt center 60a, an arrangement of the first and second parallel windings in each pair in at least one phase belt 60, as viewed in an order of vicinity to the phase belt center 60a, is such that the first and second parallel windings are arranged in an order of the second, first, second, first, first, second, first, second, first, second, second, and first parallel windings as the top coils 20, and the first and second parallel windings are arranged in an order of the first, second, second, first, second, first, first, second, first, second, second, and first parallel windings as the bottom coils 30 connected to the top coils 20.

The configuration according to the present embodiment as above can make the circulating current in load operation smaller than in related art and can provide a rotating machinery equipped with armature windings with reduced loss.

Figure 5:
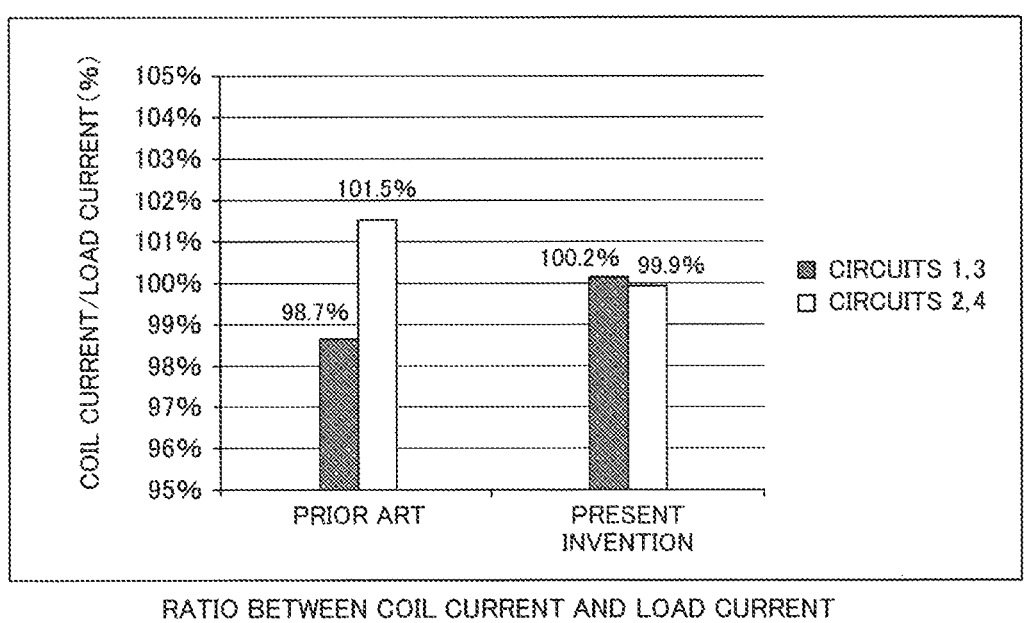
FIG. 5 is a diagram representing a ratio between coil current and load current under a rated load condition with regard to the present invention and prior art (Patent document 1).

FIG. 5 represents a ratio between coil current and load current under a rated load condition with regard to the present invention and prior art (Patent document 1).

As is obvious in this drawing, a maximum value of the coil current/load current ratio for the present invention is 100.2% and a minimum value thereof is 99.9%. A difference between these values is smaller than the difference between a maximum value of 101.5% and a minimum value of 98.7 of the coil current/load current ratio for the prior art (Patent document 1).

A smaller difference (smaller unbalance) between the maximum and minimum values of this coil current/load current ratio indicates a smaller circulating current. Therefore, it can be said that the present invention can make the circulating current smaller than in prior art (Patent document 1).

Now, the embodiment works equally well even in a case where the combinations of the top coils 20 and the bottom coils 30 are inverted in the connections described previously for the first embodiment. Similar effectiveness can be obtained, for example, even in an arrangement in which the bottom coils 30 are arranged, from the center of the phase belt 60, in a sequence of second, first, second, first, first, second, first, second, first, second, second, and first parallel windings and the top coils 20 connected to the bottom coils 30 are arranged in a sequence of first, second, second, first, second, first, first, second, first, second, second, and first parallel windings.

In addition, while the method of connections according to the first embodiment is used to configure windings in a rotating machinery having an arrangement of four parallel circuits with two poles and seventy-two slots, it goes without saying that the first embodiment is applicable for a rotating machinery having an arrangement of 4n parallel circuits with 2n poles and 72n slots, when n is assumed to be an integer of 1 or more, because the number of slots per phase and per pole is twelve even in the latter rotating machinery.

Now, the present invention is not limited to the described embodiment and various modifications are included therein. For example, the foregoing embodiment is one described in detail to explain the present invention clearly and the invention is not necessarily limited to that including all components described. A subset of the components of an embodiment can be replaced by components of another embodiment. To the components of an embodiment, components of another embodiment can be added. For a subset of the components of each embodiment, other components can be added to the subset or the subset can be removed or replaced by other components.

REFERENCE SIGNS LIST

10 . . . stator core, 20 . . . top coil, 30 . . . bottom coil, 40 . . . teeth, 50 . . . stator slot, 60 . . . phase belt, 60a . . . phase belt center, 70 . . . terminal, 80 . . . jumper connection and 100 . . . rotor.

What is claimed is:

1. Rotating machinery comprising a 2n-pole rotor, a stator core with 72n stator slots, and three-phase armature windings, where n denotes an integer not less than 1, wherein:
    each of the stator slots houses a top coil on an inner radius side of each of the stator slots and a bottom coil on an outer radius side thereof;
    each of the armature windings is formed by connecting the top coil and the bottom coil and has 2n phase belts per phase; and
    each of the phase belts includes a first parallel winding and a second parallel winding,
    wherein the first and second parallel windings are arranged in the stator slots as the top coil and the bottom coil, and
    assuming that a circumferential mean position of all top coils and bottom coils included in each of the phase belts is defined as a phase belt center, an arrangement of the first and second parallel windings in at least one phase belt, as viewed in an order of proximity to the phase belt center, is such that the first and second parallel windings are arranged in an order of the second, first, second, first, first, second, first, second, first, second, second, and first parallel windings as the top coils or the bottom coils, and the first and second parallel windings are arranged in an order of the first, second, second, first, second, first, first, second, first, second, second, and first parallel windings as the other bottom coils connected to the abovementioned top coils or the other top coils connected to the abovementioned bottom coils.

* * * * *